United States Patent [19]

Kaneda et al.

[11] 4,400,769

[45] Aug. 23, 1983

[54] VIRTUAL MACHINE SYSTEM

[75] Inventors: Saburo Kaneda, Yokohama; Naomi Matsumura, Tokyo; Fujio Ikegami, Yokohama; Kazuyuki Shimizu, Machida; Yukichi Ikuta, Tama, all of Japan

[73] Assignee: Fujitsu Limited, Kawasaki, Japan

[21] Appl. No.: 198,010

[22] PCT Filed: Feb. 20, 1980

[86] PCT No.: PCT/JP80/00023

§ 371 Date: Oct. 21, 1980

§ 102(e) Date: Oct. 15, 1980

[87] PCT Pub. No.: WO80/01850

PCT Pub. Date: Sep. 4, 1980

[30] Foreign Application Priority Data

Feb. 21, 1979 [JP] Japan ................................ 54-19440

[51] Int. Cl.³ .......................... G06F 9/00; G06F 9/46
[52] U.S. Cl. .................................................. 364/200
[58] Field of Search ... 364/200 MS File, 900 MS File, 364/131-133

[56] References Cited

U.S. PATENT DOCUMENTS

| | | |
|---|---|---|
| 3,611,307 | 10/1971 | Podvin et al. |
| 3,614,742 | 10/1971 | Watson et al. |
| 3,858,182 | 12/1974 | Delagi et al. ............... 364/200 |
| 4,084,224 | 4/1978 | Appell et al. ............... 364/200 |
| 4,084,228 | 4/1978 | Dufond et al. ............. 364/200 |
| 4,123,795 | 10/1978 | Dean, Jr. et al. ........... 364/200 |
| 4,253,145 | 2/1981 | Goldberg .................... 364/200 |
| 4,257,096 | 3/1981 | McCullough et al. ..... 364/200 |
| 4,347,565 | 8/1982 | Kaneda et al. ............. 364/200 |

OTHER PUBLICATIONS

Robert B. Goldberg, *Survey of Virtual Machine Research*, Honeywell Information Systems & Harvard Press, pp. 34-45.

J. P. Buzen & U. O. Gagliardi, *The Evolution of the Virtual Machine*, National Computer Conference, 1973, pp. 291-299.

*Primary Examiner*—James D. Thomas
*Assistant Examiner*—Archie E. Williams, Jr.
*Attorney, Agent, or Firm*—Staas & Halsey

[57] ABSTRACT

A virtual machine system is provided with a control program for concurrently operating a plurality of OSs (Operating Systems). The object is to suppress the overhead produced when simulating privileged instructions for controlling program status words (PSWs). For this purpose, there is provided simple hardware, in place of the software control conventionally used, including a modification register for storing information required to modify the current PSW information and a pending register for storing pending interrupt information for communication to the corresponding OS.

14 Claims, 6 Drawing Figures

VIRTUAL MACHINE SYSTEM

BACKGROUND OF THE INVENTION

The present invention relates to a virtual machine system and, more particularly, relates to a virtual machine system provided with management programs which are used for running a plurality of operating systems parallelly at the same time.

In recent years, the concepts of virtual storage and virtual machines have been of increasing interest in the computing community. The virtual storage system may be defined generally as any information storage system in which there is, or may be, a distinction between the logical address generated by a program and the physical address for some real storage device from which information is actually fetched. Similarly, the virtual machine system may be defined as a computing system in which the instructions issued by a program may be different from those actually executed by the hardware to perform a given task. The above concepts of the virtual storage and virtual machines are very important when creating a large capacity computing system. In the present invention, the virtual machine is specifically referred to, rather than the virtual storage.

As will be explained hereinafter in detail, the virtual machine has an advantage in that, as compared to a conventional native machine, a plurality of programs, each of which runs in one of a corresponding plurality of operating systems, can be executed parallelly at the same time and also the organization of the computing system can be flexibly modified. However, the virtual machine has a disadvantage in that, as compared to the conventional native machine, the virtual machine often operates with a reduction of capacity due to the occurrence of so-called overhead.

SUMMARY OF THE INVENTION

Therefore, it is an object of the present invention to provide a virtual machine system which can operate with no reduction of capacity, despite the overhead in the virtual machine system. Many kinds of overhead may be induced in the virtual machine system; however, the virtual machine system of the present invention is especially useful for suppressing a particular kind of overhead, one which is induced during simulation of an operation conducted by a privileged instruction.

DESCRIPTION OF THE PREFERRED EMBODIMENT

The concept of a "virtual machine" arose in the latter half of the year 1960 and many attempts have been made to put the concept of "a virtual machine" into practice. The merits of the "virtual machine" may be classified into two categories mentioned in the following paragraphs (A) and (B).

(A) A system can be realized by using a single computer, in which circumstance each of a plurality of users, which commonly utilize the single computing system, can utilize it as if each user exclusively occupies the single computing system.

(B) It is possible to create an imaginary computing system having an architecture which is slightly different from that of the real computing system and it is also possible to create an imaginary computing system which has an organization which is slightly different from that of the real computing system.

Thus, as previously mentioned, the virtual machine has the advantage that, as compared to a conventional native machine, it can accommodate a plurality of programs each of which runs in one of a corresponding plurality of operating systems (hereinafter referred as OS), and also organization of the computing system can be flexibly modified. Further, it is possible to supervise the operation of the system, and furthermore it is possible for each user to utilize the debugging function of the system itself.

Figure 1:
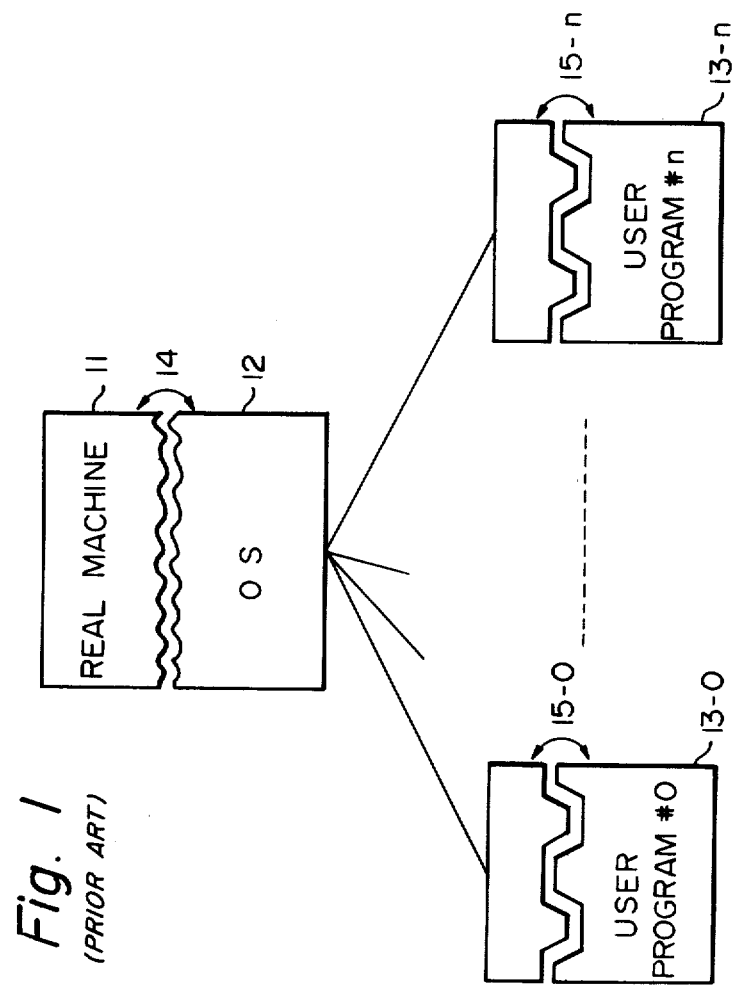
FIG. 1 illustrates the organization of a conventional native computing system.

In FIG. 1, which illustrates the organization of a conventional native computing system, part 11 represents a real machine, that is, the hardware of the computing system, and part 12 represents the OS. A plurality of user programs 13-o through 13-n are executed under the control of the OS 12. Accordingly, the OS 12 manages the user programs 13-o through 13-n so that the user programs may commonly occupy the system resources. The "system resources" means, for example, a CPU (central processing unit), a main storage device, I/O (Input/Output) control devices, I/O devices, a system console and so on. The OS 12 cooperates with the real machine 11 via an imaginary hardware interface 14. The user programs cooperate with the OS 12, via user program/OS interfaces 15-o through 15-n, respectively.

Figure 2:
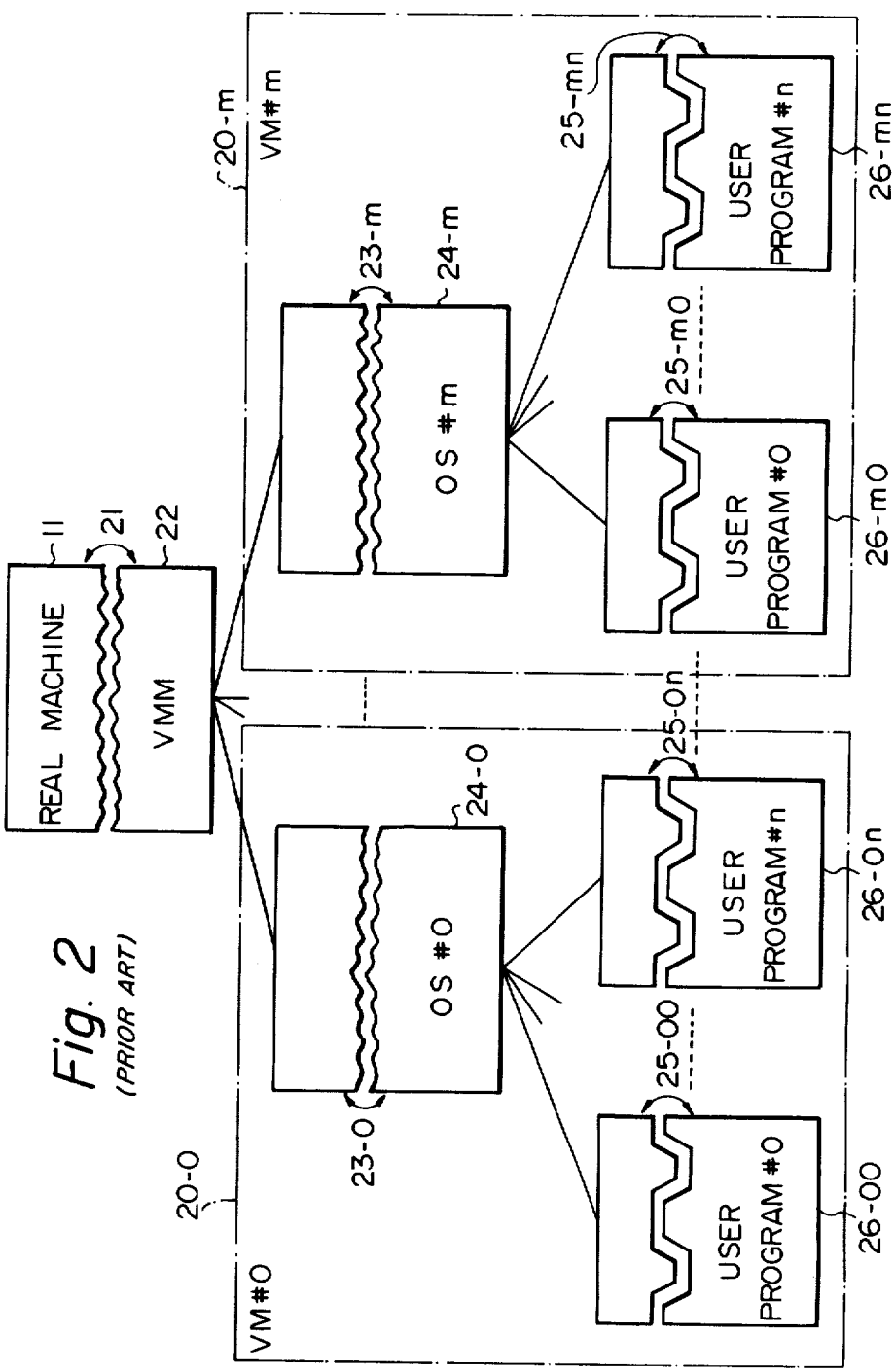
FIG. 2 illustrates the organization of a conventional virtual machine system to which the present invention specifically refers.

Contrary to the above, in the virtual machine system, a VMM (virtual machine monitor), instead of the OS in FIG. 1, manages the user programs, so that the user programs may commonly occupy the computer resources. In FIG. 2, which illustrates the organization of the virtual machine system to which the present invention specifically refers, blocks 20-0 through 20-m, which are enclosed by long and short dash lines, respectively represent VM (virtual machine) #o through VM#m. Each of the VMs20-0 through 20-m corresponds to the conventional native computing system shown in FIG. 1. In the virtual machine system of FIG. 2, it is possible for the VMs 20-o through 29-m to run in the system simultaneously. The conventional virtual machine system is discussed in various publications, for example, "Survey of Virtual Machine Research" by Robert P. Goldberg, Honeywell Information Systems and Harvard University, pages 34 through 45, and "The evolution of virtual machine architecture" by J. P. BUZEN and U. O. GAGLIARDI, Honeywell Information Systems, Inc. Billerica, Massachusetts and Harvard University Cambridge, Mass., of the National Computer Conference, 1973, pages 291 through 299.

In a typical native computing system, multiprogramming is often employed therein, for the purpose of increasing the efficiency thereof, by which multiprogramming all of the programs can commonly share the system resources. Accordingly, management of the system resources is achieved by the OS. In this case, the OS can access the system resources by using a "privileged instruction". "A privileged instruction" can be issued only from the OS. On the other hand, a "non-privileged mode" is allotted to each of the user programs and, if a "privileged instruction" is specified by the user program, the program interrupt is detected by the hardware, which program interrupt is called a "privileged operation exception".

In the virtual machine system of FIG. 2, a plurality of OSs 24-o through 24-m run therein parallelly at the same time, and accordingly, the system resources (not shown) are managed under control of a program which is called a VMM (virtual machine monitor) (see the reference numeral 22), instead of the OS, as occurs in the conventional native computing system. In this case, the "non-privileged mode" is allotted to both the user programs (26-oo through 26-on, 26-mo through 26-mn) and the corresponding OSs (24-o~24-m), while only the VMM 22 operates in the "privileged mode". Accordingly, if the OS which controls some user programs specifies a "privileged instruction", the hardware detects, simultaneously, the program interrupt. Then the interruption is transferred to the VMM 22, and the VMM 22 starts executing the simulation of said "privileged instruction". The VMM 22 cooperates with real machine 11 via a hardware interface 21. The OSs 24-o through 24-m cooperate with the VMM 22 via hardware interfaces 23-o through 23-m, respectively. In the VM 20-o, the user programs 26-oo through 26-on cooperate with the corresponding OS 24-o via user/OS interfaces 25-oo through 25-on, respectively. In the VM20-m, the user programs 26-mo through 26-mn cooperate with the corresponding OS 24-m via user/OS interfaces 25-mo through 25-mn.

In the virtual machine system, as previously mentioned, a plurality of OSs run therein parallelly at the same time. Therefore, it is preferable for each OS to have the same amount of memory space as the main storage of the real machine. The total memory space is defined by the following product: (space per OS) x (the number of OSs). In the prior art, the above mentioned virtual storage is utilized in the system so as to economically obtain said space. In this case, as will be mentioned hereinafter, the management of the main storage is achieved by the VMM. Consequently, the VMM performs characteristic functions mentioned in the following paragraphs (C) through (E).

(C) The VMM controls each user program together with the corresponding OS so as to commonly share the system resources with a high degree of efficiency.

(D) the VMM simulates the "privileged instructions which are issued by the operating system.

(E) the VMM receives all the interrupts, such as an I/O interrupt, an external interrupt, an interrupt for controlling the virtual storage and so on, and then the VMM carries out a process in accordance with the respective sources of said interrupts. The VMM may further communicate each occurrence of said interrupts to the corresponding OS, if necessary.

Figure 3:
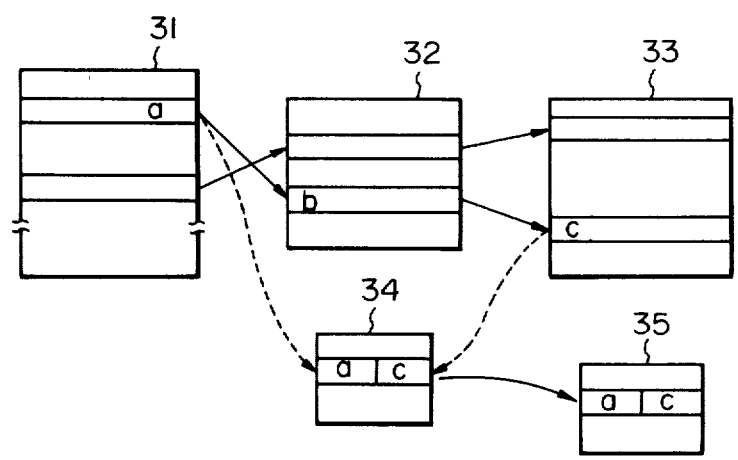
FIG. 3 illustrates blocks used for explaining both the presence of address spaces and the addressing processes in the conventional virtual storage.

The management of the main storage in the virtual machine system will be explained below. FIG. 3 illustrates blocks used for explaining one example of both the address spaces and the addressing processes. Specifically, the example to which FIG. 3 relates corresponds to the case where OS which runs in the virtual machine system employs the virtual storage. In FIG. 3, both virtual addresses 31 and "real" addresses 32 are addresses of the virtual storage, and both are managed by the OSs (24-o through 24-m in FIG. 2). The relationship between the addresses 31 and 32 is defined by a DAT (dynamic address translation) table (not-shown). The DAT table is managed by each OS. In the conventional computing system (not the virtual machine system) an address corresponding to a "real" address 32 is related to an address of the main storage. However, in the virtual machine system, since a plurality of OSs exists therein at the same time, the real machine 11 has, in its real storage area, not enough address space for accommodating the "real" addresses. Therefore, in the virtual machine system, the "real" addresses 32 (which are managed by the OS) are assumed as logical addresses from the VMM point of view and the logical addresses are transformed to a real addresses 33. In this case, the VMM manages the space of the main storage 33 in the real machine. The management of the VMM is called a dual-paging. However, the system which employs dual-paging is liable to create a very heavy overhead in view of the capacity of the system. Therefore, in order to increase the capacity of the system, the VMM manages the space of the main storage by means of a shadow table 34, and thereby the processing speed of the system is greatly increased. The shadow table 34 is considered to be a combination of two DAT tables. In other words, the VMM manages a translation table between the logical addresses (31) which are managed by the OSs and the main storage addresses (33). If one of said two DAT tables (31 and 32) is updated, the VMM must communicate the update to the shadow table 34. The reference numeral 35 represents a TLB (translation look-aside buffer). The VMM may utilize the TLB 35, if necessary, in order to further increase said processing speed.

The management of the main storage in the CPU has been mentioned hereinbefore. Now the process with respect to the channel by which the VMM, communicates will be mentioned below. It should be noted that, generally, the rear machine may mainly be classified into said CPU and said channel. When the OS of the VM provides an instruction for starting an I/O device, which instruction is a "privileged instruction", the VMM collects this instruction through a synchronous interrupt operation. A channel program for starting the I/O device by said OS of the VM is expressed by a "real" address which is managed by the OS. Accordingly, the channel program is reconstructed, by the VMM, in the main storage (which is managed by the VMM), and then a data address, a CCW (channel command word) address and so on, are retranslated into the real address in the real machine. Consequently, the CCW, which may be modified by the user program, is not effective at any time.

As will be understood from the above description, the overhead in the virtual machine system is very much larger than the overhead in a system operated by an OS in the usual manner during the execution of the same program. The overhead is basically classified into direct overhead and indirect overhead. The former and latter overheads will be explained in the following paragraphs (F) and (G), respectively.

(F) Direct Overhead

The direct overhead arises mainly during the processing of the software by the VMM, and several kinds of overhead exist in the system, as described below.

(a) A first source of overhead is arises during the simulation of a "privileged instruction". As previously mentioned, since the "non-privileged mode" is allotted to each user program together with the corresponding OS, the "privileged instructions" which are issued by the OS are all simulated by the VMM.

(b) A second source of overhead is arises during the "dispatching" of a VM to direct it into operation.

(c) A third source of overhead is arises when the virtual storage is supported by the OS. The third source of overhead corresponds to the overhead which is created during the management of the above mentioned shadow table.

(d) A fourth source of overhead is arises during the conversion of the channel program. In this case, since the channel program, which is used for starting the I/O device by the OS, is a logical address from the real machine point of view, the VMM translates the logical address to the real address for the real machine.

(e) A fifth source of overhead is arises during the support of the interrupt. In the conventional virtual machine, since all the interrupts are collected by the VMM through the synchronous interrupt operation, the system must "reflect" or communicate the presence of the interrupt to the corresponding OS. Thus, the VMM carries out the operation for reflecting said interrupt to said OS.

(f) A sixth source of overhead is arises during the support of the console. The VMM supports the console and also the debugging function.

(G) Indirect Overhead

In the currently used OS, various kinds of algorithms are incorporated for allocation of the system resources and also for management thereof, so as to utilize the system resources with a high degree of efficiency. However, such an OS is frequently inefficient when it runs in the virtual machine system.

In connection with the above item (a), that is, the first source of overhead arising during the simulation of a "privileged instruction," there are basically four kinds of "privileged instructions."

(1) The first kind is a "privileged instruction" which is used for controlling a PSW (program status word).

(2) The second kind is a "privileged instruction" which is used for controlling a timer. The timer is employed in the system so as to permit time-sharing, for example a CPU timer.

(3) The third kind is a "privileged instruction" which is used for the management of the virtual storage.

(4) The fourth kind is a "privileged instruction" used for controlling other operations required in the system.

The function of the above mentioned "privileged instructions" and also the process for the simulation thereof will be explained below.

① The first "privileged instruction" for controlling the PSW

A PSW is utilized by every VM under the time-sharing mode, and accordingly, the PSW of each VM is alocated in the main storage as an actually existing PSW. Generally, a PSW has a mask against interrupts, which mask functions to control asynchronous interrupts, such as an I/O interrupt, an external interrupt and so on, and thereby the system resources, such as the I/O devices, the external devices and so on, can be commonly shared by each VM. In this case, the "privileged instruction" used for controlling the PSW is simulated in the following manner.

(1a) Even if the PSW corresponding to a presently operating VM is instructed to close the mask against an interrupt, that is the interrupt is kept pending by the mask, a current PSW is set in a status so as not to close said mask, where the current PSW is what is actually used for controlling the hardware. Specifically, even if an instruction for starting an I/O device is generated during the operation of, for example, the VM 20-o (see FIG. 2) and the corresponding I/O interrupt is generated during the operation of, for example, the VM 20-m (see FIG. 2), the I/O interrupt is always accepted by the VMM.

(1b) If the PSW corresponding to a presently operating VM is instructed to open the mask against the interrupt, that is the interrupt is to become effective, the current PSW, which is what actually controls the hardware, accepts the information in accordance with said instruction. Next, the VMM checks whether or not an asynchronous interrupt, with respect to said VM, is pending. If said asynchronous interrupt is pending, the VMM operates so as to communicate the pending asynchronous interrupt to the said VM.

Figure 4:
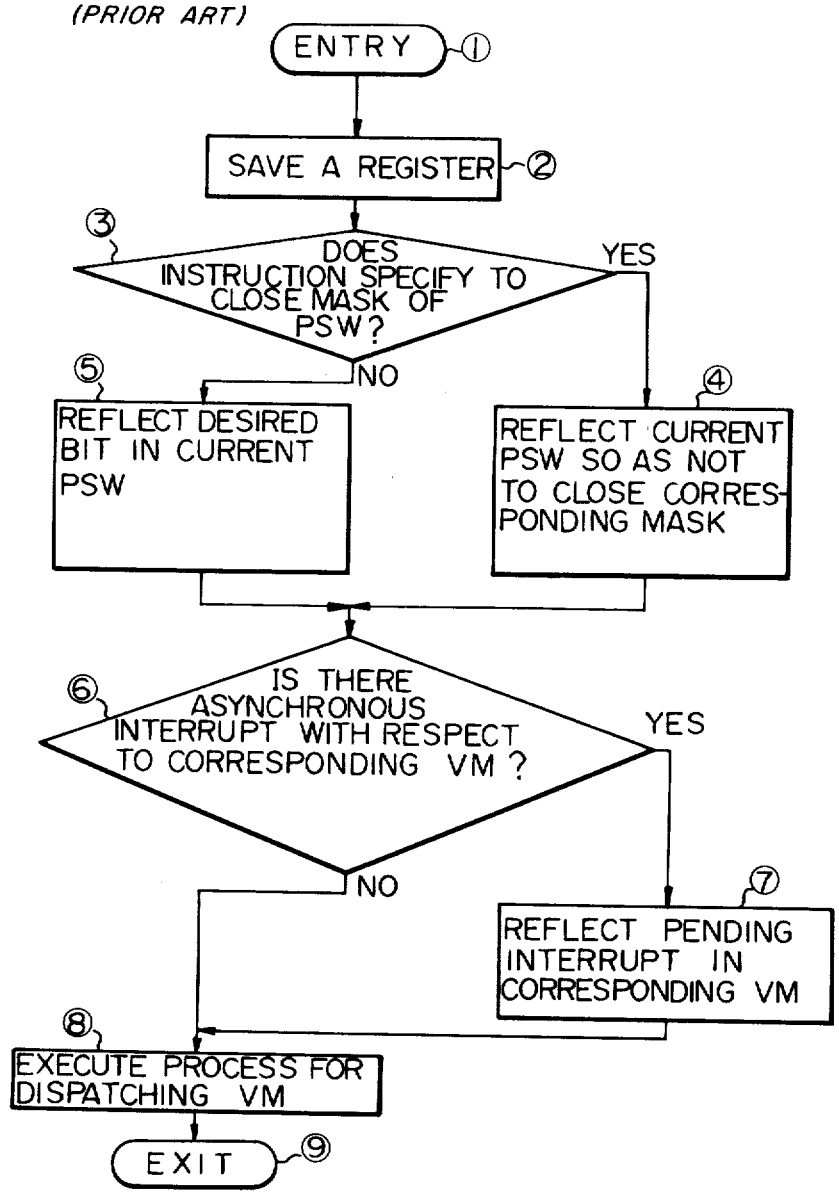
FIG. 4 depicts a flowchart used for explaining the operation of the VMM incorporated in the conventional virtual machine system.

The processes mentioned in the above paragraphs (1a) and (1b), are schematically revealed in the flow-chart of FIG. 4. The details of this flowchart will be explained hereinafter.

② The second "privileged instruction" being used for controlling the timer

A timer is utilized by each VM operating in a time-sharing mode and a timer is commonly utilized by the VMM as a timer for dispatching VMs. Accordingly, the timer used for dispatching and timers employed in each VM are located in the main storage as actually existing logical timers. When the (m+1) numbers of the VMs, that is the VMs 20-0 through VM 20-m (refer to FIG. 2), are being operated under the control of the VMM, the minimum value of time among the aforesaid timers is set in the timer of the system. That is, if a "privileged instruction" is detected by the hardware, which "privileged instruction" is used for setting the timer of some VM, the time specified by this timer is compared with the present time specified by the timer of the system, and either one of the times, whichever has the minimum value of time, is set in the timer of the system. And when, VMM is informed of the interrupt of the timer, the times stored in the main storage of each of for said timers of the VMs and said timer for dispatching are updated. Then the VMM ascertains whether said interrupt is an interrupt by the timer for the VM or an interrupt by the timer for dispatching. If the VMM determines that said interrupt is an interrupt by the timer for dispatching, a dispatching operation is started by the VMM in accordance with a routine for processing the dispatching operation. On the contrary, if the VMM determines that said interrupt is an interrupt by the timer in the VM, the VMM operates so as to reflect the interrupt with respect to the corresponding VM.

③ The third "privileged instruction" being used for the management of the virtual storage Such "privileged instructions" may be classified into the three categories mentioned in the following items (3a), (3b) and (3c).

(3a) A first instruction for reading from or writing into a key storage.

(3b) A second instruction for translating a logical address into a real address.

(3c) A third instruction for reading from or writing into a prefix register.

As previously mentioned with reference to FIG. 3, if each of the VMs operates by utilizing virtual storage, the "real" address space which is managed by the OS of the corresponding VM is considered, in the virtual machine system, to be the logical address space by the VMM. Therefore, the VMM manages the space of the main storage in the real machine by means of the aforesaid dual-paging and shadow table.

Thus, the third "privileged instruction" is simulated by the VMM by translating the "real" address into the real key by means of both the DAT table which is managed by the OS of the corresponding VM and the DAT table which is managed by the VMM itself.

④ The fourth "privileged instruction" for controlling other operations required in the system The fourth type of "privileged instruction" is specifically a "privileged instruction" used for detecting a CPU identifier and a channel identifier, a "privileged instruction" used for starting an I/O device and so on. Execution of these privileged instructions is simulated by the VMM.

As mentioned above, although the virtual machine system has various merits, the virtual machine system also induces, simultaneously, a reduction of capacity due to increased overhead.

The virtual machine system of the present invention is very useful for suppressing the above mentioned sources of overhead, and above all, for suppressing the overhead which arises during the simulation of a "privileged instruction" especially the "privileged instruction" which is used for controlling the PSW (refer to the above recited paragraph ① ).

With reference to FIG. 4 and the paragraphs ① including the items (1a) and (1b), in the conventional virtual machine system, the VMM simulates a "privileged instruction" used for controlling the PSW according to the routine revealed by the flowchart of FIG. 4. The routine contains nine steps, ① through ⑨ . It should be understood that the steps ① through ⑨ are conducted under the control of the VMM for the purpose of saving the process executed by a VM from destruction, which destruction may occur if another VM also executes its own process independently, irrespective of the process executed by the first VM. Usually, it is necessary for the VMM to execute about four hundred sub-steps for completing the steps ① through ⑨ in FIG. 4. Therefore, it is very important to know that the amount of software to be processed by the VMM becomes very large. This is the reason why many kinds of overhead are induced in the conventional virtual machine system. As will be clear hereinafter, the virtual machine system of the present invention includes no such large amount of software, and the same functions which would have been performed by the software of the prior art can be achieved by very simple hardware, instead of said software.

Returning to FIG. 4, the step ① ("ENTRY") denotes the entry of the routine. In the step ② ("SAVE A REGISTER"), the register is saved by the VMM, which register stores the last information with respect to the PSW of the currently running VM in order to save the information from destruction induced by an incoming "privileged instruction." In the step ③ ("DOES INSTRUCTION SPECIFY TO CLOSE MASK OF PSW?"), if the result is "YES," the step ④ ("REFLECT CURRENT PSW SO AS NOT TO CLOSE CORRESPONDING MASK") is executed, which step ④ corresponds to the process mentioned in the above item (1a) of paragraph ① . Contrary to the above, if the result of the step ③ is "NO," the step ⑤ ("REFLECT DESIRED BIT IN CURRENT PSW") is executed, which step ⑤ corresponds to the process mentioned in the above item (1b) of paragraph ① . The step ⑥ ("IS THERE PENDING ASYNCHRONOUS INTERRUPT WITH RESPECT TO CORRESPONDING VM?") follows after the step ④ or ⑤ to determine whether there is a pending interrupt corresponding to the current VM. If the result of the step ⑥ is "YES," the step ⑦ ("REFLECT PENDING INTERRUPT IN CORRRESPONDING VM") is executed to communicate the interrupt to the current VM. Contrary to the above, if the result of the step ⑥ is "NO," the step ⑧ ("EXECUTE PROCESS FOR DISPATCHING VM") follows thereafter so that the VMM directs the continued operation of the current VM. The step ⑧ also follows after the step ⑦ . Then the routine reaches step ⑨ ("EXIT").

As previously mentioned, the virtual machine system of the present invention does not include a large amount of software as expressed by the flowchart in FIG. 4, and the same functions can be achieved by very simple hardware instead of said software. In short, in the virtual machine system of the present invention, which virtual machine system is provided with management programs which are used for running a plurality of OSs parallelly at the same time, a modification register and a pending register are accomodated therein. The modification register operates so as to modify the PSW which controls each OS and the pending register operates so as to hold the pending interrupt with respect to each OS, and thereby it is not necessary for the VMM to execute the corresponding process every time the OS changes the PSW, through the asynchronous interrupt under the control of said management program.

Figure 5:
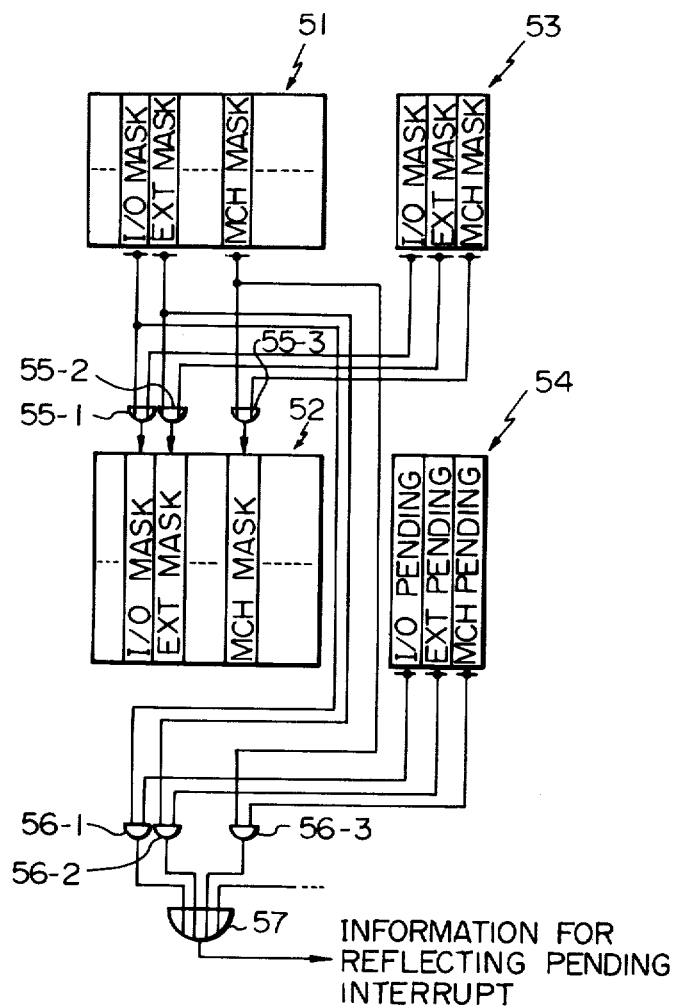
FIG. 5 illustrates block diagrams of hardware which are employed in a virtual machine system, according to the present invention.
Figure 6:
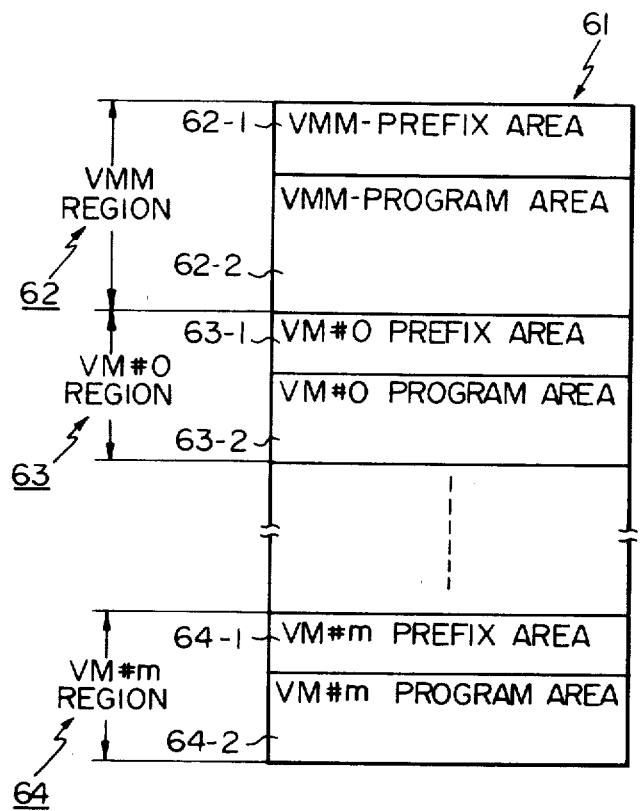
FIG. 6 depicts a conventional organization of a main storage area which is suitable for operating the hardware of FIG. 5.

FIG. 5 illustrates a block diagram of the hardware employed in the virtual machine system according to the present invention. FIG. 6 depicts a conventional main storage organization which is suitable for operating the hardware of FIG. 5. In FIG. 6, the reference numeral 61 indicates the main storage of the real machine 11 (FIG. 2). The main storage 61 is basically composed of a VMM region 62, and a VM#0 region 63 through a VM#m region 64. The VMM region 62 is comprised of both a VMM prefix area 62-1 and a VMM program area 62-2. The VM#o region 63 is also comprised of both a VM#o-prefix area 63-1 and a VM#o-program area 63-2, and similarly, the VM#m region 64 is comprised of both a VM#m prefix area 64-1 and a VM#m-program area 64-2. The VM#o-region 63 stores information with regard to the corresponding OS 24-o (see FIG. 2). The VM#m region 64 also stores information with regard to the corresponding OS 24-m (see FIG. 2).

With reference to FIG. 5, which shows the essential part of the present invention, the reference numeral 51 represents a VM controlling PSW register. The register 51 acts as a register to store the PSW for controlling the VM to "dispatched" or directed into operation by the VMM. The register 51 is comprised of a plurality of bits which indicate information about, for example, the I/O mask, the EXT (external) mask, the MCH (machine check) mask and so on. The information contained in the register 51 is updated every time a new VM is dispatched. The reference numeral 52 represents a current PSW register. The hardware of the virtual machine system is controlled according to the information contained in the register 52. The reference numeral 53 represents a modification register. The register 53 contains information about, for example, the I/O mask, the EXT mask, the MCH mask and so on. However, only the I/O, EXT and MCH masks are shown in FIG. 5. Each item of information in the register 51 and each item of the corresponding information in register 53 are supplied to the corresponding mask bit of the register 52, via the respective OR gates 55-1, 55-2 and 55-3.

The respective items of information in the modification register 53 are updated every time a VM is dispatched. The register 53 is useful for dealing with the case mentioned below. Provided that, for example, the VM#o (see 20-o in FIG. 2) is now running in the system, and, for example, the VM#m (see 20-m in FIG. 2) was previously running therein, and if it is expected that an I/O interrupt will occur after having been initiated during the running of the VM#m in accordance with an instruction for starting an I/O device which came from the VM#m, the corresponding information is set in the register 53. In this case, even if the I/O mask of the register 51 was instructed by the VM#o to close, the I/O interrupt of the VM#m can be alive. That is, the I/O interrupt of the VM#m is reflected in the register 52 via the OR gate 55-1. In other words, even if the I/O mask in the register 51 is set to the logic "0" by the VM#o, which logic "0" indicates that the I/O mask should be closed, the corresponding I/O mask in the register 52 can be set to the logic "1," because the logic "1," which was set in the corresponding I/O mask in the register 53, is given to the corresponding I/O mask in the register 52 via the OR gate 55-1. Thus, said I/O interrupt can be allowed to be effective in the system. At the same time, the information about said I/O interrupt is loaded in a control block corresponding to the VM#m of the VMM region 62 (FIG. 6) contained in the main storage 61.

The above mentioned process corresponds to the operation defined by the steps ③ and ④ of the prior art shown in FIG. 4. If the result of the step ③ is "NO," the I/O mask in the register 51 is set to the logic "1". This logic "1" is directly supplied to the I/O mask in the register 52 via the gate 55-1, which operation corresponds to the step ⑤ shown in FIG. 4.

Provided that the VM#o is now running in the system, and, for example, the VM#m was previously running therein and an I/O interrupt initiated by the VM#m is provided during the running of the VM#o, this I/O interrupt is stored in a memory area in a control block that is contained in the main storage 61 and that corresponds to a pending register 54; when the I/O interrupt is detected by the VMM during the running of the VM#o. Thus, the memory area corresponding to the register 54 has a logic "1," indicating the pending I/O interrupt of the VM#m. The information about this pending I/O interrupt (having a logic "1") is transferred to the corresponding bit of the I/O pending portion of the register 54, which is mounted in the CPU (real machine), when the VM#m is later despatched into operation. Consequently, the I/O interrupt of the VM#m can be transferred to the VM#m.

The modification register 53 and the pending register 54 are located in the CPU (real machine). These registers are not sensible to the programs of the VMs. This is because the programs of VMs are only sensible of the current PSW register 52. The information contained in these registers 51, 53, and 54 is updated by the VMM every time a VM is dispatched.

For example, when the VM#o is running in the system and also the I/O mask bit in the register 53 is set to logic "1," the corresponding I/O mask bit in the register 52 is changed to logic "1" via the OR gate 55-1. Therefore, even though the VM#o is instructed to close its I/O mask, the corresponding I/O mask in the register 52 cannot be closed. Thus, the register 52, which controls the hardware of the virtual machine system, allows other VMs to perform an I/O interrupt with respect to the VM#o. In other words, even if the VM#m has been provided with an instruction for starting an I/O device and, further, even if the I/O interrupt, corresponding to said instruction for starting the I/O device, is generated during the running of the VM#o, the VMM can collect the I/O interrupt, and the information indicating the generation of said I/O interrupt is stored in a control block, corresponding to the VM#m, of the VMM region 62.

On the other hand, when the information about the I/O interrupt is stored in the control block corresponding to the VM#m and the VM#m is dispatched into operation, the VMM loads the information stored in said memory area corresponding to the register 54 into the register 54 of the CPU, and also the VMM loads the information stored in a memory area corresponding to the register 51 of the control block contained in the main storage 61 into the register 51 of the CPU, in order to dispatch the VM#m. In this case, if the I/O mask bit of the register 51 is logic "1," which indicates that the interrupt can be conducted, the corresponding AND gate 56-1 is opened. Then the I/O interrupt operation can be conducted with respect to the VM#m in response to the information produced from the OR gate 57 via the AND gate 56-1. Thus, the pending I/O interrupt, with respect to the VM#m, can correctly be reflected to the VM#m. The above operations correspond to the operations defined by the steps ⑥, ⑦ and ⑧. If there is no pending I/O interrupt, the current process is continued by dispatching the VM#m so that it becomes operative.

In FIG. 5, the registers 53 and 54 must have the mask information and pending information, respectively. The register 53 should have the I/O mask information and the register 54 should have the I/O pending information. This is because I/O interrupts are generated in the system very frequently. The register 53 can contain the MCH mask information, if necessary, and accordingly the register 54 can contain the MCH pending information, if necessary, if the MCH mask information is entered into the register 53. This is because the MCH is generated only a rare case. The EXT information is generated more frequently than the MCH information.

As mentioned above, according to the invention, it is possible for the virtual machine system to suppress the overhead which is created during the simulation of the "privileged instruction," especially the "privileged instruction" which is used for controlling the PSW. It is preferable to combine the means for suppressing the overhead created by both "privileged instructions" which are used for controlling the timer and the management of the virtual storage, with the said means for suppressing the overhead created by the "privileged instruction" for the PSW. Thus, a virtual machine system having a high degree of operating speed and a high degree of efficiency can be realized.

We claim:

1. A virtual machine system for using a management program to run a plurality of operating systems parallelly, the virtual machine system having a CPU which comprises:
   a virtual machine controlling PSW register which stores the PSW (program status word) information for controlling said operating systems;
   a modification register which stores information for modifying said PSW information;
   a pending register which stores information indicating a pending interrupt with respect to a corresponding operating system;
   a first means responsive to the contents of said virtual machine controlling PSW register and said modification register for modifying current PSW information which is used for controlling the hardware of the virtual machine system, even though said virtual machine controlling PSW register indicates that a mask operation is to be conducted, in accordance with the information contained in said modification register, so that said mask operation is cancelled; and
   a second means responsive to the contents of said virtual machine controlling PSW register and said pending register for communicating the information about said pending interrupt contained in said pending register to the corresponding operating system when the PSW information is said virtual machine controlling PSW register is changed to information which indicates that the interrupt operation is to be conducted.

2. A system as set forth in claim 1, wherein the items of information to be contained in the modification register and the pending register are changeable in accordance with the management program.

3. A system as set forth in claim 1, wherein the first means is comprised of at least one OR gate having an input responsive to one bit of the virtual machine controlling PSW register and an input responsive to a corresponding bit of the modification register, the output of said OR gate producing the corresponding current PSW information.

4. A system as set forth in claim 1, wherein the second means is comprised of at least one AND gate having an input responsive to one bit of the virtual machine controlling PSW register and an input responsive to a corresponding bit of the pending register, the output of said AND gate producing the corresponding information for communicating the pending interrupt to the corresponding operating system.

5. A system as set forth in claim 1, wherein the modification register contains I/O mask information.

6. A system as set forth in claim 5, wherein the modification register further contains EXT (external) mask information.

7. A system as set forth in claim 6, wherein the modification register further contains MCH (machine check) mask information.

8. A system as set forth in claims 5, 6, or 7, wherein the pending register and the modification register have paired storage positions for respectively storing pending information and the corresponding mask information for each item of pending information.

9. A system as set forth in claim 8, wherein the virtual machine controlling PSW register contains at least I/O mask information, EXT mask information and MCH mask information.

10. An improved virtual machine system of the type wherein a plurality of concurrently operating virtual machines are controlled by corresponding program status words having I/O mask bit positions for containing information about whether the corresponding virtual machine will accept an I/O interrupt, said system including a CPU with a program status word register to control the operation thereof, wherein the improvement comprises:
    first means in said CPU having an I/O mask bit storage position for storing the I/O mask bit of a program status word corresponding to a presently operative virtual machine;
    second means in said CPU having an I/O mask bit storage position for storing an I/O mask bit for a previously operative virtual machine awaiting a corresponding I/O interrupt;
    third means in said CPU responsive to the I/O mask bit storage positions of the first and second means for determining the content of the I/O mask bit position of the CPU's program status word register, thereby allowing the CPU to process an I/O interrupt corresponding to either of the presently operative virtual machine and said previously operative virtual machine awaiting an I/O interrupt;
    fourth means in said CPU having an I/O pending storage position for storing information about the receipt of an I/O interrupt corresponding to said previously operative virtual machine awaiting an I/O interrupt; and
    fifth means in said CPU responsive to the I/O mask bit storage position of the first means and to the I/O pending storage position of the fourth means for emitting a signal when said previously operative virtual machine becomes operative again following the receipt of the awaited I/O interrupt.

11. The system of claim 10, wherein the program status words additionally have external interrupt mask bit positions for containing information about whether the corresponding virtual machine will accept an external interrupt, and
    wherein the first means additionally comprises an external interrupt mask bit storage position for storing the external interrupt mask bit of a program status word corresponding to a presently operative virtual machine,
    wherein the second means additionally comprises an external interrupt mask bit storage position for storing an I/O mask bit for a previously operative virtual machine awaiting a corresponding external interrupt,
    further comprising sixth means in said CPU responsive to the external interrupt mask bit storage positions of the first and second means for determining the content of the external interrupt mask bit position of the CPU's program status word register, thereby allowing the CPU to process an external interrupt corresponding to either of the presently operative virtual machine and said previously operative virtual machine awaiting an external interrupt,
    wherein the fourth means additionally comprises an external interrupt pending storage position for storing information about the receipt of an external interrupt corresponding to said previously operative virtual machine awaiting an external interrupt, and further comprising seventh means in said CPU responsive to the external interrupt mask bit storage storage position of the first means and to the external interrupt pending storage position of the fourth means for emitting a signal when said previously operative virtual machine becomes operative again following the receipt of the awaited external interrupt.

12. The system of claim 11, further comprising an OR gate in said CPU having a first input responsive to the output of the fifth means and a second input responsive to the output of the seventh means.

13. The system of claim 12, wherein the program status words additionally have machine check interrupt mask bit positions for containing information about whether the corresponding virtual machine will accept a machine check interrupt, and wherein the first means additionally comprises a machine check interrupt mask bit storage position for storing the machine check interrupt mask bit of a program status word corresponding to a presently operative virtual machine, wherein the second means additionally comprises a machine check interrupt mask bit storage position for storing a machine check mask bit for a previously operative virtual machine awaiting a corresponding mechine check interrupt, further comprising eighth means in said CPU responsive to the machine check interrupt mask bit storage positions of the first and second means for determining the content of the machine check interrupt mask bit position of the CPU's program status word register, thereby allowing the CPU to process a machine check interrup corresponding to either of the presently operative virtual machine and said previously operative virtual machine awaiting a machine check interrupt, wherein the fourth means additionally comprises a machine check interrupt pending storage position for storing information about the receipt of a machine check interrupt corresponding to said previously operative virtual machine awaiting a machine check interrupt, and further comprising ninth means in said CPU responsive to the machine check interrupt mask bit storage position of the first means and to the machine check interrupt pending storage position of the fourth means for emitting a signal when said previously operative virtual machine becomes operative again following receipt of the awaited machine check interrupt.

14. The system of claim 13, wherein said OR gate additionally has a third input responsive to the output of the ninth means.

* * * * *

UNITED STATES PATENT AND TRADEMARK OFFICE
CERTIFICATE OF CORRECTION

PATENT NO. : 4,400,769                                    Page 1 of 2

DATED     : August 23, 1983

INVENTOR(S) : Kaneda et al.

It is certified that error appears in the above-identified patent and that said Letters Patent is hereby corrected as shown below:

Col. 2, line 57, "VMs20-0" should be --VMs 20-o--.
Col. 3, line 27, "mode"." should be --"mode."--;
       line 29, "instruction"," should be --instruction,"--;
       line 33, "instruction"." should be --instruction."--;
       line 60, "instructions" should be --instructions"--.

Col. 4, line 6, after "where" insert --the--;
       line 22, "OS)" should be --OSs)--;
       line 24, delete "a";
       line 51, "instruction"," should be --instruction,"--.

Col. 5, line 7, delete "is";
       line 8, "instruction"." should be --instruction."--;
       line 13, delete "is";
       line 15, delete "is";
       line 20, delete "is";
       line 26, delete "is";
       line 34, delete "is";
       line 65, "alocated" should be --allocated--;
       line 68, delete "an" (first occurrence);
               "interrupt, an" should be --interrupts,--;
               "interrupt" (second occurrence) should be
                        --interrupts--.

UNITED STATES PATENT AND TRADEMARK OFFICE
CERTIFICATE OF CORRECTION

PATENT NO. : 4,400,769

DATED : August 23, 1983

INVENTOR(S) : Kaneda et al.

It is certified that error appears in the above-identified patent and that said Letters Patent is hereby corrected as shown below:

```
Col.  6, line 33, delete "being used";
         line 51, delete "," (first occurrence);
         line 52, "of" (first occurrence) should be --for--;
                  delete "for";
         line 64, delete "being used".

Col.  7, line 36, "instruction" should be --instruction,"--;

Col.  9, line 58, delete ";".

Col. 10, line 4, after "of" (first occurrence) insert
                  --the--.

Col. 13, line 6, delete "storage".

Col. 14, line 2, "mechine" should be --machine--;
         line 9, "interrup" should be --interrupt--.
```

Signed and Sealed this

Nineteenth Day of June 1984

[SEAL]

Attest:

GERALD J. MOSSINGHOFF

Attesting Officer

Commissioner of Patents and Trademarks